United States Patent
Holtmanns et al.

(10) Patent No.: US 9,843,569 B2
(45) Date of Patent: *Dec. 12, 2017

(54) METHOD AND APPARATUS FOR ACCESS CREDENTIAL PROVISIONING

(71) Applicant: Nokia Technologies Oy, Espoo (FI)

(72) Inventors: Silke Holtmanns, Klaukkala (FI); André Dolenc, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/813,241

(22) Filed: Jul. 30, 2015

(65) Prior Publication Data
US 2015/0334106 A1    Nov. 19, 2015

Related U.S. Application Data

(63) Continuation of application No. 13/879,698, filed as application No. PCT/IB2010/054786 on Oct. 21, 2010, now Pat. No. 9,137,662.

(51) Int. Cl.
G06F 7/04  (2006.01)
G06F 15/16  (2006.01)
(Continued)

(52) U.S. Cl.
CPC .......... *H04L 63/08* (2013.01); *H04L 63/0892* (2013.01); *H04L 63/102* (2013.01);
(Continued)

(58) Field of Classification Search
CPC ....... H04L 63/08; H04L 63/10; H04L 63/083; H04L 63/0853; H04L 63/102
(Continued)

(56) References Cited

U.S. PATENT DOCUMENTS

| | | |
|---|---|---|
| 8,712,474 B2 | 4/2014 | Gehrmann |
| 2006/0230265 A1 | 10/2006 | Krishna |
| | (Continued) | |

FOREIGN PATENT DOCUMENTS

| | | |
|---|---|---|
| CN | 101001187 A | 7/2007 |
| CN | 101765107 A | 6/2010 |
| | (Continued) | |

OTHER PUBLICATIONS

3rd Generation Partnership Project; Technical Specification Group Services and System Aspects; Feasibility Study on the Security Aspects of Remote Provisioning and Change of Subscription for Machine to Machine (M2M) Equipment (Release 9), 3GPP TR 33.812, V9.2.0, Jun. 2010, pp. 1-87.
(Continued)

*Primary Examiner* — Kambiz Zand
*Assistant Examiner* — Stephen Sanders
(74) *Attorney, Agent, or Firm* — Alston & Bird LLP

(57) ABSTRACT

A method and apparatus are provided for access credential provisioning. A method may include receiving, at a first mobile apparatus, information about a second mobile apparatus. The first mobile apparatus may be provisioned with network access credential information to be transferred from the first mobile apparatus to the second mobile apparatus. The method may further include causing the information about the second mobile apparatus to be provided to a provisioning apparatus for the network. The method may additionally include receiving authorization form the provisioning apparatus to transfer the network access credential information from the first mobile apparatus to the second mobile apparatus. The method may also include, in response to receipt of the authorization, causing the network access credential information to be provided to the second mobile apparatus. A corresponding apparatus is also provided.

18 Claims, 7 Drawing Sheets

(51) Int. Cl.
  *G06F 17/30* (2006.01)
  *H04L 29/06* (2006.01)
  *H04W 8/20* (2009.01)
  *H04W 12/06* (2009.01)

(52) U.S. Cl.
  CPC .......... *H04W 8/205* (2013.01); *H04W 12/06* (2013.01); *H04L 63/0492* (2013.01); *H04L 63/061* (2013.01)

(58) Field of Classification Search
  USPC .......................................................... 726/4
  See application file for complete search history.

(56) References Cited

U.S. PATENT DOCUMENTS

| | | | |
|---|---|---|---|
| 2006/0242410 A1 | 10/2006 | Aftab et al. | |
| 2006/0293028 A1 | 12/2006 | Gadamsetty et al. | |
| 2009/0036126 A1 | 2/2009 | Morikuni et al. | |
| 2009/0205028 A1* | 8/2009 | Smeets | G06F 21/445 726/6 |
| 2010/0095359 A1* | 4/2010 | Gordon | H04W 12/06 726/6 |

FOREIGN PATENT DOCUMENTS

| | | |
|---|---|---|
| EP | 1806902 | 7/2007 |
| EP | 2112634 | 10/2009 |
| EP | 2154861 A2 | 2/2010 |
| WO | WO 2007/049856 A1 | 5/2007 |
| WO | WO 2009/092115 A2 | 7/2009 |
| WO | WO 2011/084117 A1 | 7/2011 |
| WO | WO 2012/042300 A1 | 4/2012 |
| WO | WO 2014/023362 A1 | 2/2014 |

OTHER PUBLICATIONS

*Bluetooth Security*, Dedoimedo, Retrieved on May 26, 2014, Webpage available at : http://www.dedoimedo.com/computers/bluetooth-security.html.
Cha et al., *Security and Trust for M2M Communications*, Proceedings of the Wireless World Research Forum, 22, May 5-7, 2009, pp. 1-8.
Extended European Search Report received for corresponding European Patent Application No. 10858582.9, dated Apr. 9, 2014, 5 pages.
International Search Report and Written Opinion from International Application No. PCT/IB2010/054786 dated Jul. 1, 2011.
Notice of Allowance for corresponding U.S. Appl. No. 13/879,698 dated May 1, 2015.
Office Action for Chinese Application No. 201080069712.9 dated Apr. 3, 2015.
Office Action for Chinese Application No. 201080069712.9 dated Nov. 18, 2015.
Office Action for corresponding U.S. Appl. No. 13/879,698 dated Jan. 12, 2015.
Office Action from Argentina Patent Application No. 20110103873, dated Dec. 5, 2014.
*Palm Pre Sync Solutions*, Treonauts, Retrieved on May 26, 2014, Webpage available at http://blog.treonauts.com/2009/06/palm-pre-sync-solutions.html.
Security and Trust for M2M Communications [online] [retrieved Mar. 17, 2015]. Retrieved from the Internet: <URL:http://andreas.schmidt.novalyst.de/docs/M2M%20Security%20v2_0.pdf> 8 pages.
Office Action from corresponding Chinese Patent Application No. 201080069712.9 dated Mar. 24, 2016.
Office Action for Argentina Application No. 20110103873 dated Feb. 2, 2016.
Office Action for Vietnamese Application No. 1-2013-01125 dated Oct. 13, 2017.

* cited by examiner

METHOD AND APPARATUS FOR ACCESS CREDENTIAL PROVISIONING

CROSS REFERENCE TO RELATED APPLICATIONS

This application is a continuation of U.S. patent application Ser. No. 13/879,698, filed on Apr. 16, 2013, which was a national stage entry of PCT Application Serial No. PCT/IB2010/054786, filed on Oct. 21, 2010, the contents of each are herein incorporated by reference in their entirety.

TECHNOLOGICAL FIELD

Example embodiments of the present invention relate generally to communications technology and, more particularly, relate to a method and apparatus for access credential provisioning.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

An operator of a network requires a mobile computing device to be provisioned with network access credentials as a condition for granting access or usage privileges for the network to the mobile computing device. For example, a network operator may charge an access or other usage fee to a user of a mobile computing device and provision network access credentials only to paying customers.

BRIEF SUMMARY

A system, method, and apparatus are herein provided for access credential provisioning. Systems, methods, and apparatuses in accordance with various embodiments may provide several advantages to computing devices, computing device users, vendors, and network operators. In this regard, some example embodiments may facilitate provision of network access credentials in a manner that may be user friendly and, in some example embodiments, user controlled. More particularly, some example embodiments enable transfer of network access credentials from a first mobile apparatus to a second mobile apparatus. Such example embodiments may, for example, enable a user to transfer network access credentials from an old mobile apparatus to a newly purchased mobile apparatus, thereby using a previously established network access subscription on the newly purchased mobile apparatus. Some example embodiments may further enable transfer of personal information, such as phonebook data, contacts data, calendar data, network settings, and/or the like to be transferred from an old mobile apparatus to a newly purchased mobile apparatus.

In a first example embodiment, a method is provided, which may comprise receiving, at a first mobile apparatus, information about a second mobile apparatus. The first mobile apparatus of this example embodiment may be provisioned with network access credential information to be transferred from the first mobile apparatus to the second mobile apparatus. The method of this example embodiment may further comprise causing the information about the second mobile apparatus to be provided to a provisioning apparatus for the network. The method of this example embodiment may additionally comprise receiving authorization from the provisioning apparatus to transfer the network access credential information from the first mobile apparatus to the second mobile apparatus. The method of this example embodiment may also comprise, in response to receipt of the authorization, causing the network access credential information to be provided to the second mobile apparatus.

In another example embodiment, an apparatus comprising at least one processor and at least one memory storing computer program code is provided. The at least one memory and stored computer program code are configured, with the at least one processor, to cause the apparatus of this example embodiment to at least receive information about a mobile apparatus. The apparatus of this example embodiment may be provisioned with network access credential information to be transferred from the apparatus to the mobile apparatus. The at least one memory and stored computer program code are configured, with the at least one processor, to further cause the apparatus of this example embodiment to cause the information about the mobile apparatus to be provided to a provisioning apparatus for the network. The at least one memory and stored computer program code are configured, with the at least one processor, to additionally cause the apparatus of this example embodiment to receive authorization from the provisioning apparatus to transfer the network access credential information to the mobile apparatus. The at least one memory and stored computer program code are configured, with the at least one processor, to also cause the apparatus of this example embodiment, in response to receipt of the authorization, to cause the network access credential information to be provided to the mobile apparatus.

In another example embodiment, an apparatus is provided that may comprise means for receiving information about a mobile apparatus. The apparatus of this example embodiment may be provisioned with network access credential information to be transferred from the apparatus to the mobile apparatus. The apparatus of this example embodiment may further comprise means for causing the information about the mobile apparatus to be provided to a provisioning apparatus for the network. The apparatus of this example embodiment may additionally comprise means for receiving authorization from the provisioning apparatus to transfer the network access credential information to the mobile apparatus. The apparatus of this example embodiment may also comprise means for, in response to receipt of the authorization, causing the network access credential information to be provided to the second mobile apparatus.

In another example embodiment, a method is provided, which may comprise causing information about a second mobile apparatus to be provided from the second mobile apparatus to a first mobile apparatus. The first mobile apparatus of this example embodiment may be provisioned with network access credential information to be transferred from the first mobile apparatus to the second mobile apparatus. The method of this example embodiment may further comprise receiving, at the second mobile apparatus, the network access credential information from the first mobile apparatus.

In another example embodiment, an apparatus comprising at least one processor and at least one memory storing computer program code is provided. The at least one memory and stored computer program code are configured, with the at least one processor, to cause the apparatus of this example embodiment to at least cause information about the apparatus to be provided to a mobile apparatus. The mobile apparatus of this example embodiment may be provisioned with network access credential information to be transferred from the mobile apparatus to the apparatus. The at least one memory and stored computer program code are configured, with the at least one processor, to further cause the apparatus of this example embodiment to receive the network access credential information from the mobile apparatus.

In another example embodiment, an apparatus is provided that may comprise means for causing information about the apparatus to be provided to a mobile apparatus. The mobile apparatus of this example embodiment may be provisioned with network access credential information to be transferred from the mobile apparatus to the apparatus. The apparatus of this example embodiment may further comprise means for receiving the network access credential information from the first mobile apparatus.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
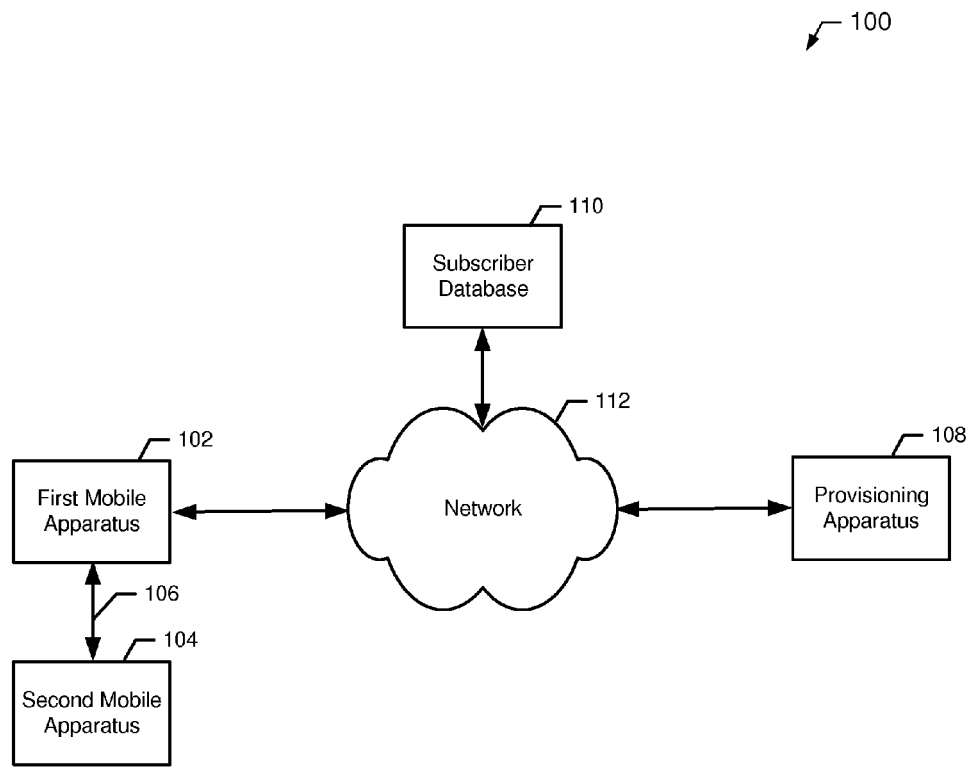
Figure 2:
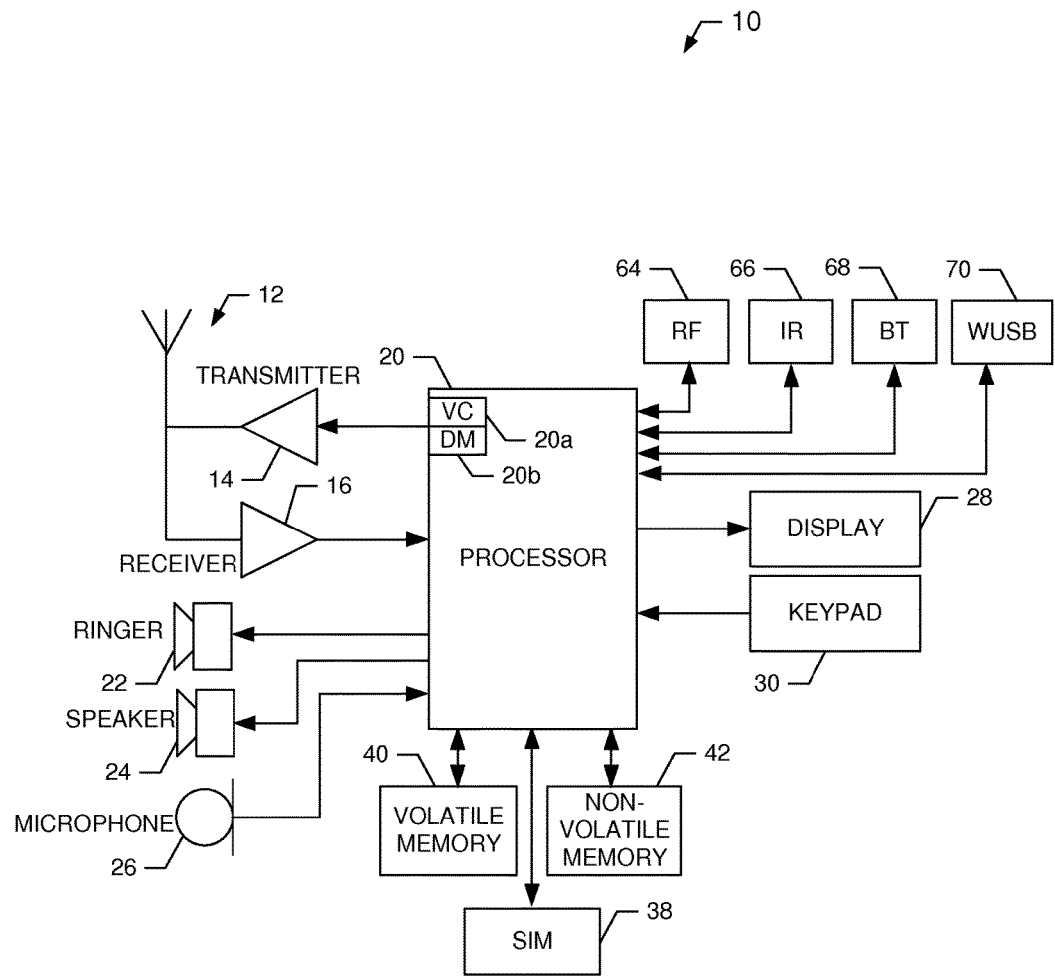
Figure 3:
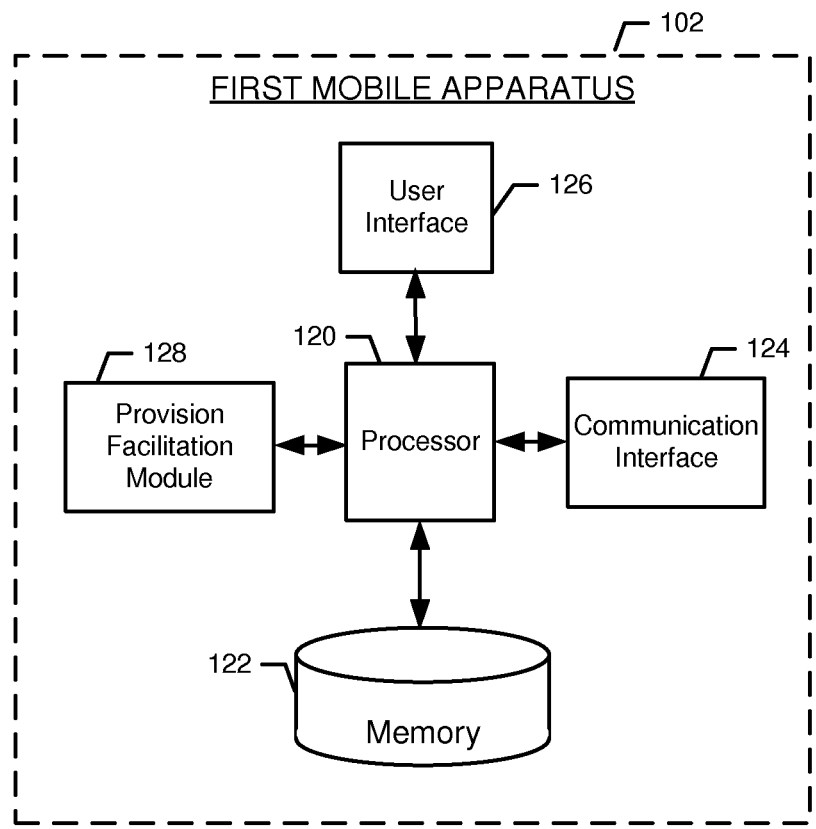
Figure 4:
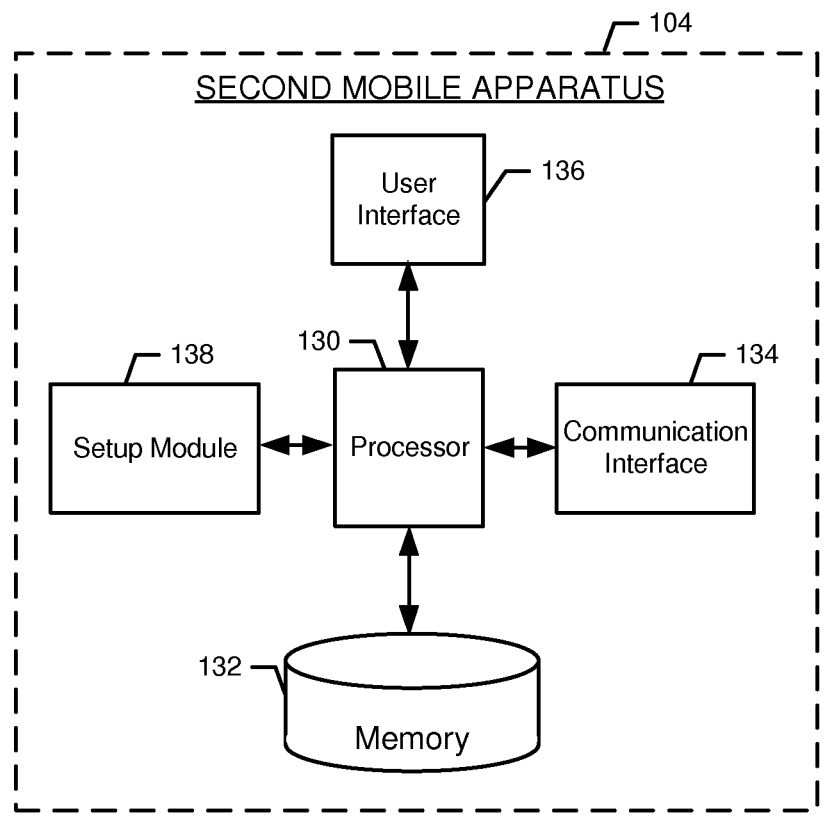
Figure 5:
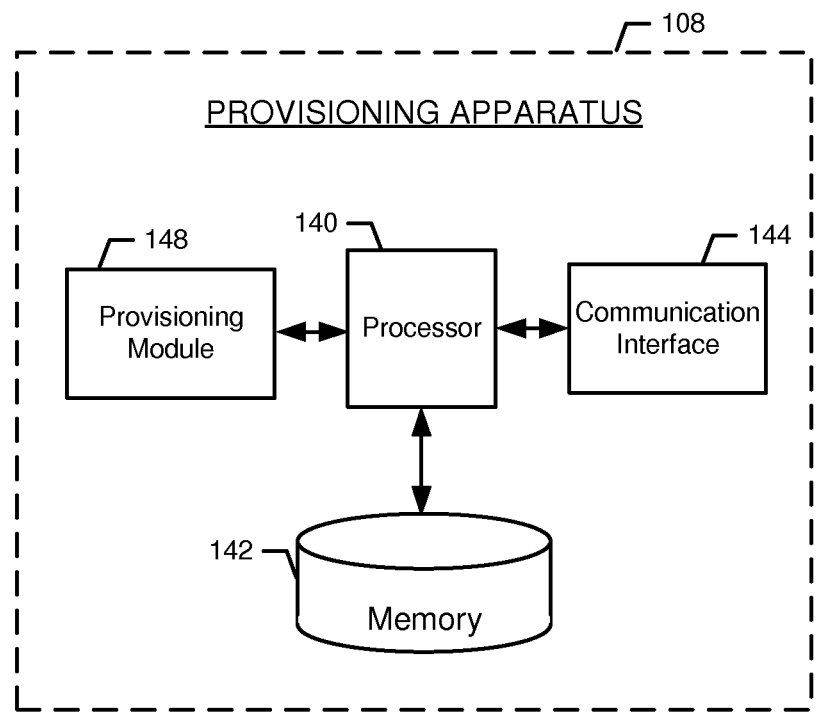
Figure 6:
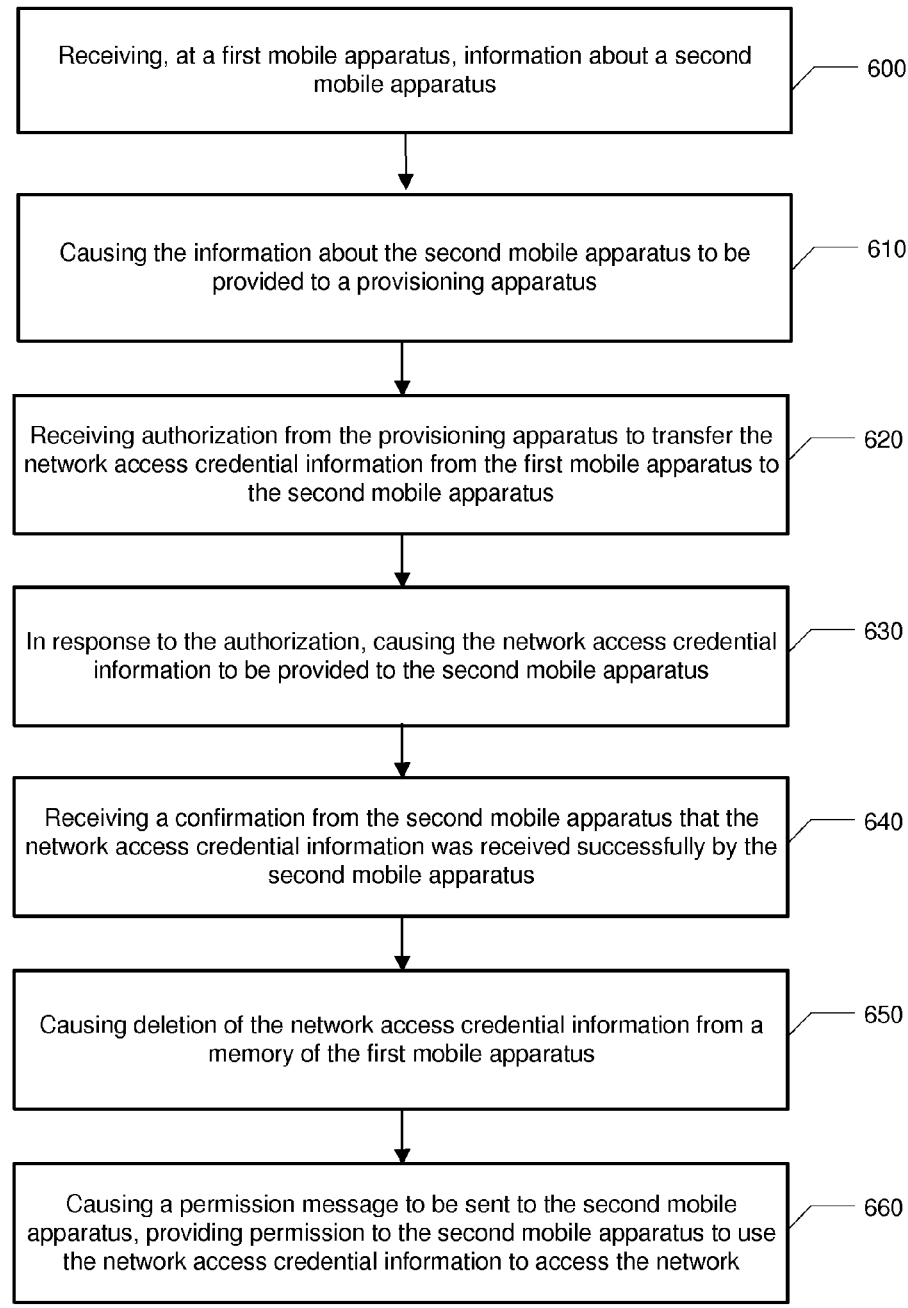
Figure 7:
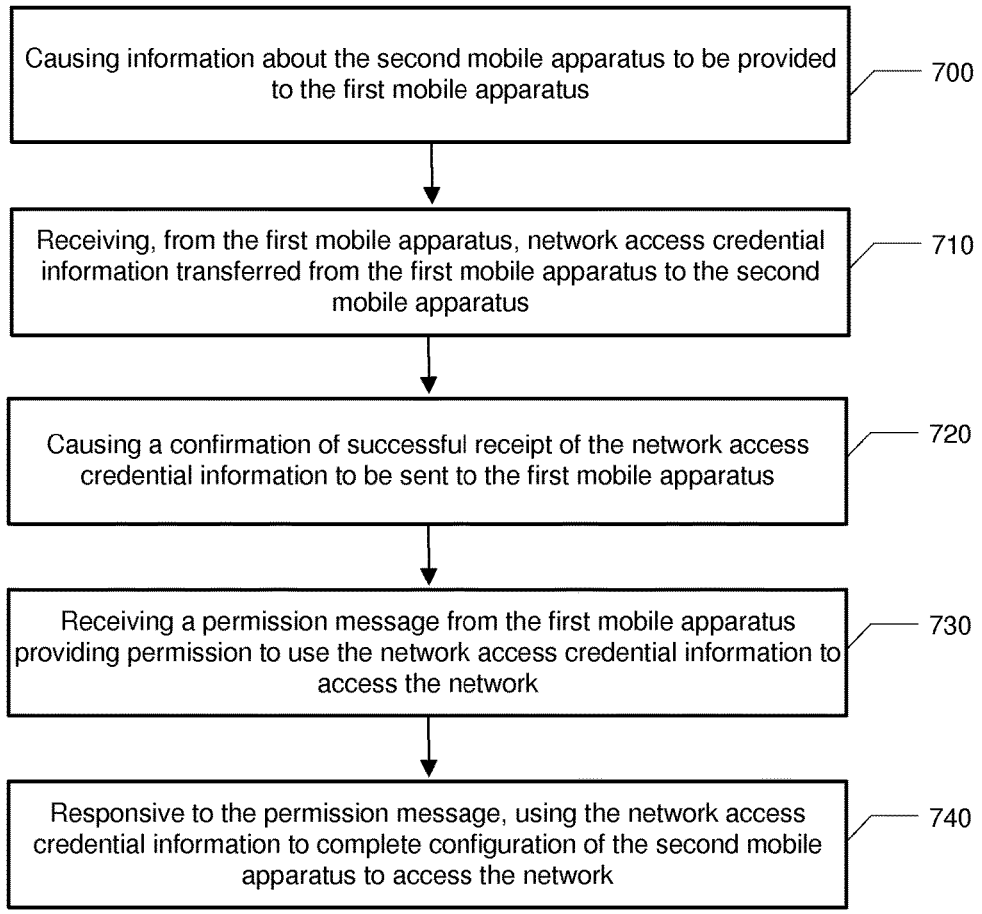

Having thus described example embodiments of the invention in general terms, reference will now be made to the accompanying drawings, which are not necessarily drawn to scale, and wherein:

FIG. 1 illustrates a system for access credential provisioning according to some example embodiments;

FIG. 2 is a schematic block diagram of a mobile terminal according to some example embodiments;

FIG. 3 illustrates a block diagram of a first mobile apparatus according to some example embodiments;

FIG. 4 illustrates a block diagram of a second mobile apparatus according to some example embodiments;

FIG. 5 illustrates a block diagram of a provisioning apparatus according to some example embodiments;

FIG. 6 illustrates a flowchart according to an example method for access credential provisioning according to some example embodiments; and FIG. 7 illustrates a flowchart according to an example method for access credential provisioning according to some example embodiments.

DETAILED DESCRIPTION

Some example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media may include, for example, coaxial cables, copper wire, fiber optic cables, and carrier waves that travel through space without wires or cables, such as acoustic waves and electromagnetic waves, including radio, optical and infrared waves. Signals may include man-made transient variations in amplitude, frequency, phase, polarization or other physical properties transmitted through the transmission media. Examples of computer-readable media may include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

In order to access a network, such as a cellular network, a mobile apparatus may need to acquire network access credentials. Provision of network access credentials to a mobile apparatus may be controlled by a network operator. Accordingly, a user of a mobile apparatuses may need to acquire network access credentials when first purchasing or activating the mobile apparatus. Acquisition of a network access credentials may pose a hurdle for unsophisticated mobile apparatus users. As such, some example embodiments provide a novel system, method, apparatus, and computer program product for access credential provisioning.

Referring now to FIG. 1, FIG. 1 illustrates a block diagram of a system 100 for access credential provisioning according to some example embodiments. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for access credential provisioning, numerous other configurations may also be used to implement embodiments of the present invention.

In some example embodiments, the system 100 may include a first mobile apparatus 102 and second mobile apparatus 104. The first mobile apparatus 102 and second mobile apparatus 104 may be configured to establish a local connection 106 and exchange data over the local connection 106. The local connection 106 may, for example, comprise a wired or wireless local connection between the first mobile apparatus 102 and the second mobile apparatus 104. By way of non-limiting example, the local connection 106 may comprise a universal serial bus (USB) connection, Institute of Electrical and Electronics Engineers (IEEE) 1394 connection, serial connection, parallel connection, wireless USB connection, Bluetooth connection, radio frequency connection, Infrared Data Association (IrDA) connection, ZigBee connection, ultra wideband (UWB), Z-Wave connection, connection in accordance with IEEE 802.15, or the like. In this regard, the local connection 106 may comprise any connection by which the first mobile apparatus 102 and second mobile apparatus 104 may exchange data. In some example embodiments, the local connection 106 may comprise a connection enabling the first mobile apparatus 102 and second mobile apparatus 104 to exchange data directly and/or securely.

The first mobile apparatus 102 and second mobile apparatus 104 may each respectively be embodied as any computing device, such as, for example, a computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), a chipset, an apparatus comprising a chipset, any combination thereof, and/or the like. In this regard, the first mobile apparatus 102 and second mobile apparatus 104 may each respectively be embodied as any computing device configured to access a network, such as a cellular network, when configured with access credential information provisioned by an operator of the network.

The system 100 may further comprise a provisioning apparatus 108. The provisioning apparatus 108 may be embodied as one or more servers, a server cluster, a cloud computing infrastructure, one or more desktop computers, one or more laptop computers, one or more network nodes, multiple computing devices in communication with each other, a chipset, an apparatus comprising a chipset, any combination thereof, and/or the like. In some example embodiments, the provisioning apparatus 108 may comprise an entity operated by a network operator that may be configured to provision access credentials for a network to an apparatus, such as the first mobile apparatus 102 and/or the second mobile apparatus 104.

The first mobile apparatus 102 and provisioning apparatus 108 may be configured to communicate over the network 112. The network 112 may comprise one or more wireless networks (for example, a cellular network, wireless local area network, wireless personal area network, wireless metropolitan area network, and/or the like), one or more wireline networks, or some combination thereof, and in some embodiments may comprise at least a portion of the internet. Accordingly, the first mobile apparatus 102 and provisioning apparatus 108 may, for example, be configured to communicate over the network 112 via email, short message service, internet protocol communication, some combination thereof, or the like.

The system 100 may additionally comprise a subscriber database 110. The subscriber database 110 may, for example, comprise a Home Subscriber Server (HSS), Home Location Register (HLR), Authentication, Authorization, and Accounting (AAA) server, some combination thereof, and/or the like. In this regard, the subscriber database 110 may, for example, comprise a database of access credential information for mobile apparatuses (e.g., for the first mobile apparatus 102, second mobile apparatus 104, and/or the like) and/or users thereof that may be maintained by a network operator. For example, the subscriber database 110 may comprise an equipment identity register (EIR). In some example embodiments, the provisioning apparatus 108 and subscriber database 110 may be co-located. In embodiments wherein the provisioning apparatus 108 and subscriber database 110 are not co-located, the provisioning apparatus 108 and subscriber database 110 may be configured to communicate and exchange data over the network 112 or other network.

According to some example embodiments, one or more of the first mobile apparatus 102 and the second mobile apparatus 104 may be embodied as a mobile terminal, such as that illustrated in FIG. 2. In this regard, FIG. 2 illustrates a block diagram of a mobile terminal 10 representative of some embodiments of a first mobile apparatus 102 and/or second mobile apparatus 104. It should be understood, however, that the mobile terminal 10 illustrated and hereinafter described is merely illustrative of one type of first mobile apparatus 102 and second mobile apparatus 104 that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40, non-volatile memory 42 may also include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Referring now to FIG. 3, FIG. 3 illustrates a block diagram of a first mobile apparatus 102 according to some example embodiments. In some example embodiments, the first mobile apparatus 102 may include various means for performing the various functions herein described. These means may comprise one or more of a processor 120, memory 122, communication interface 124, user interface 126, or provision facilitation module 128. The means of the first mobile apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 122) that is executable by a suitably configured processing device (for example, the processor 120), or some combination thereof.

In some example embodiments, one or more of the means illustrated in FIG. 3 may be embodied as a chip or chip set. In other words, the first mobile apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, user interface 126, and/or provision facilitation module 128 may be embodied as a chip or chip set. The first mobile apparatus 102 may therefore, in some example embodiments, be configured to implement example embodiments of the present invention on a single chip or as a single "system on a chip." As another example, in some example embodiments, the first mobile apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some example embodiments the processor 120 may comprise a plurality of processors. The plurality of processors may be in operative communication with each other and may be collectively configured to perform one or more functionalities of the first mobile apparatus 102 as described herein. The plurality of processors may be embodied on a single computing device or distributed across a plurality of computing devices collectively configured to function as the first mobile apparatus 102. In embodiments wherein the first mobile apparatus 102 is embodied as a mobile terminal 10, the processor 120 may be embodied as or may comprise the processor 20. In some example embodiments, the processor 120 is configured to execute instructions stored in the memory 122 or otherwise accessible to the processor 120. These instructions, when executed by the processor 120, may cause the first mobile apparatus 102 to perform one or more of the functionalities of the first mobile apparatus 102 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 3 as a single memory, the memory 122 may comprise a plurality of memories. The plurality of memories may be embodied on a single computing device or may be distributed across a plurality of computing devices collectively configured to function as the first mobile apparatus 102. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the first mobile apparatus 102 is embodied as a mobile terminal 10, the memory 122 may comprise the volatile memory 40 and/or the non-volatile memory 42. The memory 122 may be configured to store information, data, applications, instructions, or the like for enabling the first mobile apparatus 102 to carry out various functions in accordance with various example embodiments. For example, in some example embodiments, the memory 122 may be configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the provision facilitation module 128 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. According to some example embodiments, the communication interface 124 may be at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the first mobile apparatus 102 and one or more computing devices or computing resources may be in communication. As an example, the communication interface 124 may be configured to enable communication between the first mobile apparatus 102 and a second mobile apparatus 104 via a local connection 106. As a further example, the communication interface 124 may be configured to enable communication between the first mobile apparatus 102 and the provisioning apparatus 108 via the network 112. The communication interface 124 may additionally be in communication with the memory 122, user interface 126, and/or provision facilitation module 128, such as via a bus.

The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. In embodiments wherein the user interface 126 comprises a touch screen display, the user interface 126 may additionally be configured to detect and/or receive an indication of a touch gesture or other input to the touch screen display. The user interface 126 may be in communication with the memory 122, communication interface 124, and/or provision facilitation module 128, such as via a bus.

The provision facilitation module 128 may be embodied as various means, such as circuitry, hardware, a computer program product comprising computer readable program instructions stored on a computer readable medium (for example, the memory 122) and executed by a processing device (for example, the processor 120), or some combination thereof and, in some example embodiments, may be embodied as or otherwise controlled by the processor 120. In embodiments wherein the provision facilitation module 128 is embodied separately from the processor 120, the provision facilitation module 128 may be in communication with the processor 120. The provision facilitation module 128 may further be in communication with one or more of the memory 122, communication interface 124, or user interface 126, such as via a bus.

Referring now to FIG. 4, FIG. 4 illustrates a block diagram of a second mobile apparatus 104 according to some example embodiments. In some example embodiments, the second mobile apparatus 104 may include various means for performing the various functions herein described. These means may comprise one or more of a processor 130, memory 132, communication interface 134, user interface 136, or setup module 138. The means of the second mobile apparatus 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 132) that is executable by a suitably configured processing device (for example, the processor 130), or some combination thereof.

In some example embodiments, one or more of the means illustrated in FIG. 4 may be embodied as a chip or chip set. In other words, the second mobile apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 130, memory 132, communication interface 134, user interface 136, and/or setup module 138 may be embodied as a chip or chip set. The second mobile apparatus 104 may therefore, in some example embodiments, be configured to implement embodiments of the present invention on a single chip or as a single "system on a chip." As another example, in some example embodiments, the second mobile apparatus 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 130 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some example embodiments the processor 130 may comprise a plurality of processors. The plurality of processors may be in operative communication with each other and may be collectively configured to perform one or more functionalities of the second mobile apparatus 104 as described herein. The plurality of processors may be embodied on a single computing device or distributed across a plurality of computing devices collectively configured to function as the second mobile apparatus 104. In embodiments wherein the second mobile apparatus 104 is embodied as a mobile terminal 10, the processor 130 may be embodied as or may comprise the processor 20. In some example embodiments, the processor 130 is configured to execute instructions stored in the memory 132 or otherwise accessible to the processor 130. These instructions, when executed by the processor 130, may cause the second mobile apparatus 104 to perform one or more of the functionalities of the second mobile apparatus 104 as described herein. As such, whether configured by hardware or software methods, or by a combination thereof, the processor 130 may comprise an entity capable of performing operations according to embodiments of the present invention while configured accordingly. Thus, for example, when the processor 130 is embodied as an ASIC, FPGA or the like, the processor 130 may comprise specifically configured hardware for conducting one or more operations described herein. Alternatively, as another example, when the processor 130 is embodied as an executor of instructions, such as may be stored in the memory 132, the instructions may specifically configure the processor 130 to perform one or more algorithms and operations described herein.

The memory 132 may comprise, for example, volatile memory, non-volatile memory, or some combination thereof. In this regard, the memory 132 may comprise a non-transitory computer-readable storage medium. Although illustrated in FIG. 4 as a single memory, the memory 132 may comprise a plurality of memories. The plurality of memories may be embodied on a single computing device or may be distributed across a plurality of computing devices collectively configured to function as the second mobile apparatus 104. In various example embodiments, the memory 132 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the second mobile apparatus 104 is embodied as a mobile terminal 10, the memory 132 may comprise the volatile memory 40 and/or the non-volatile memory 42. The memory 132 may be configured to store information, data, applications, instructions, or the like for enabling the second mobile apparatus 104 to carry out various functions in accordance with various example embodiments. For example, in some example embodiments, the memory 132 may be configured to buffer input data for processing by the processor 130. Additionally or alternatively, the memory 132 may be configured to store program instructions for execution by the processor 130. The memory 132 may store information in the form of static and/or dynamic information. This stored information may be stored and/or used by the setup module 138 during the course of performing its functionalities.

The communication interface 134 may be embodied as any device or means embodied in circuitry, hardware, a computer program product comprising computer readable program instructions stored on a computer readable medium (for example, the memory 132) and executed by a processing device (for example, the processor 130), or a combination thereof that is configured to receive and/or transmit data from/to another computing device. According to some example embodiments, the communication interface 134 may be at least partially embodied as or otherwise controlled by the processor 130. In this regard, the communication interface 134 may be in communication with the processor 130, such as via a bus. The communication interface 134 may include, for example, an antenna, a transmitter, a receiver, a transceiver and/or supporting hardware or software for enabling communications with one or more remote computing devices. The communication interface 134 may be configured to receive and/or transmit data using any protocol that may be used for communications between computing devices. In this regard, the communication interface 134 may be configured to receive and/or transmit data using any protocol that may be used for transmission of data over a wireless network, wireline network, some combination thereof, or the like by which the second mobile apparatus 104 and one or more computing devices or computing resources may be in communication. As an example, the communication interface 134 may be configured to enable communication between the second mobile apparatus 104 and the first mobile apparatus 102 via a local connection 106. The communication interface 134 may additionally be in communication with the memory 132, user interface 136, and/or setup module 138, such as via a bus.

The user interface 136 may be in communication with the processor 130 to receive an indication of a user input and/or to provide an audible, visual, mechanical, or other output to a user. As such, the user interface 136 may include, for example, a keyboard, a mouse, a joystick, a display, a touch screen display, a microphone, a speaker, and/or other input/output mechanisms. In embodiments wherein the user interface 136 comprises a touch screen display, the user interface 136 may additionally be configured to detect and/or receive an indication of a touch gesture or other input to the touch screen display. The user interface 136 may be in communication with the memory 132, communication interface 134, and/or setup module 138, such as via a bus.

The setup module 138 may be embodied as various means, such as circuitry, hardware, a computer program product comprising computer readable program instructions stored on a computer readable medium (for example, the memory 132) and executed by a processing device (for example, the processor 130), or some combination thereof and, in some example embodiments, may be embodied as or otherwise controlled by the processor 130. In embodiments wherein the setup module 138 is embodied separately from the processor 130, the setup module 138 may be in communication with the processor 130. The setup module 138 may further be in communication with one or more of the memory 132, communication interface 134, or user interface 136, such as via a bus.

FIG. 5 illustrates a block diagram of a provisioning apparatus 108 according to some example embodiments. In some example embodiments, the provisioning apparatus 108 may include various means for performing the various functions herein described. These means may comprise one or more of a processor 140, memory 142, communication interface 144, or provisioning module 148. The means of the provisioning apparatus 108 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 142) that is executable by a suitably configured processing device (for example, the processor 140), or some combination thereof.

In some example embodiments, one or more of the means illustrated in FIG. 5 may be embodied as a chip or chip set.

In other words, the provisioning apparatus 108 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 140, memory 142, communication interface 144, and/or provisioning module 148 may be embodied as a chip or chip set. The provisioning apparatus 108 may therefore, in some example embodiments, be configured to implement embodiments of the present invention on a single chip or as a single "system on a chip." As another example, in some example embodiments, the provisioning apparatus 108 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 140 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 5 as a single processor, in some example embodiments the processor 140 may comprise a plurality of processors. The plurality of processors may be in operative communication with each other and may be collectively configured to perform one or more functionalities of the provisioning apparatus 108 as described herein. The plurality of processors may be embodied on a single computing device or distributed across a plurality of computing devices collectively configured to function as the provisioning apparatus 108. In some example embodiments, the processor 140 is configured to execute instructions stored in the memory 142 or otherwise accessible to the processor 140. These instructions, when executed by the processor 140, may cause the provisioning apparatus 108 to perform one or more of the functionalities of the provisioning apparatus 108 as described herein. As such, whether configured by hardware or software methods, or by a combination thereof, the processor 140 may comprise an entity capable of performing operations according to embodiments of the present invention while configured accordingly. Thus, for example, when the processor 140 is embodied as an ASIC, FPGA or the like, the processor 140 may comprise specifically configured hardware for conducting one or more operations described herein. Alternatively, as another example, when the processor 140 is embodied as an executor of instructions, such as may be stored in the memory 142, the instructions may specifically configure the processor 140 to perform one or more algorithms and operations described herein.

The memory 142 may comprise, for example, volatile memory, non-volatile memory, or some combination thereof. In this regard, the memory 142 may comprise a non-transitory computer-readable storage medium. Although illustrated in FIG. 5 as a single memory, the memory 142 may comprise a plurality of memories. The plurality of memories may be embodied on a single computing device or may be distributed across a plurality of computing devices collectively configured to function as the provisioning apparatus 108. In various example embodiments, the memory 142 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 142 may be configured to store information, data, applications, instructions, or the like for enabling the provisioning apparatus 108 to carry out various functions in accordance with various example embodiments. For example, in some example embodiments, the memory 142 may be configured to buffer input data for processing by the processor 140. Additionally or alternatively, the memory 142 may be configured to store program instructions for execution by the processor 140. The memory 142 may store information in the form of static and/or dynamic information. This stored information may be stored and/or used by the provisioning module 148 during the course of performing its functionalities.

The communication interface 144 may be embodied as any device or means embodied in circuitry, hardware, a computer program product comprising computer readable program instructions stored on a computer readable medium (for example, the memory 142) and executed by a processing device (for example, the processor 140), or a combination thereof that is configured to receive and/or transmit data from/to another computing device. According to some example embodiments, the communication interface 144 may be at least partially embodied as or otherwise controlled by the processor 140. In this regard, the communication interface 144 may be in communication with the processor 140, such as via a bus. The communication interface 144 may include, for example, an antenna, a transmitter, a receiver, a transceiver and/or supporting hardware or software for enabling communications with one or more remote computing devices. The communication interface 144 may be configured to receive and/or transmit data using any protocol that may be used for communications between computing devices. In this regard, the communication interface 144 may be configured to receive and/or transmit data using any protocol that may be used for transmission of data over a wireless network, wireline network, some combination thereof, or the like by which the provisioning apparatus 108 and one or more computing devices or computing resources may be in communication. As an example, the communication interface 144 may be configured to enable communication between the provisioning apparatus 108 and one or more of the first mobile apparatus 102, second mobile apparatus 104, or subscriber database 110 over a network (for example, the network 112). The communication interface 144 may additionally be in communication with the memory 142, and/or provisioning module 148, such as via a bus.

The provisioning module 148 may be embodied as various means, such as circuitry, hardware, a computer program product comprising computer readable program instructions stored on a computer readable medium (for example, the memory 142) and executed by a processing device (for example, the processor 140), or some combination thereof and, in some example embodiments, may be embodied as or otherwise controlled by the processor 140. In embodiments wherein the provisioning module 148 is embodied separately from the processor 140, the provisioning module 148 may be in communication with the processor 140. The provisioning module 148 may further be in communication with one or more of the memory 142, or communication interface 144, such as via a bus.

In accordance with various example embodiments, the first mobile apparatus 102 may be provisioned with network access credential information. This network access credential information may, for example, provide configuration settings and/or other information enabling the first mobile apparatus 102 to access an operator network, such as the network 112. In this regard, the network access credential information may comprise at least the required security information to access an operator network, but may also encompass personal user information, network settings information, service-related information, and/or the like. The network access credential information may, for example, comprise, access credentials, cryptographic algorithm(s), network settings, service information, configuration information, and/or the like. In some example embodiments, the provisioned network access credential information may comprise Subscriber Identity Module (SIM) data and may comprise an application (for example, a SIM application) or other software that may be installed on the first mobile apparatus 102. In some example embodiments wherein the network access credential information comprises SIM data, the SIM data may, for example, comprise a soft SIM, a fixed SIM, a soft USIM, a fixed USIM, and/or the like.

A user of the first mobile apparatus 102 may, for example, purchase the second mobile apparatus 104 as a replacement for the first mobile apparatus 102. As such, the user may desire to transfer the network access credential information from the first mobile apparatus 102 to the second mobile apparatus 104 so that the user may access the network using the second mobile apparatus 104. In this regard, transfer of the network access credential information may, for example, enable the user to transfer an existing network access subscription for an operator's network from the first mobile apparatus 102 to the second mobile apparatus 104.

In order to enable transfer of the network access credential information from the first mobile apparatus 102 to the second mobile apparatus 104 on the network, a local connection 106 may be established between the first mobile apparatus 102 and the second mobile apparatus 104. In some example embodiments, establishment of the local connection 106 and/or transfer of the network access credential information may be triggered responsive to a user input to the user interface 126 of the first mobile apparatus 102 commanding transfer the network access credential information. Alternatively, in some example embodiments, establishment of the local connection 106 and/or transfer of the network access credential information may be triggered responsive to a user input to the user interface 136 of the second mobile apparatus 104 commanding transfer the network access credential information. In some example embodiments, a secure pairing may be established between the first mobile apparatus 102 and second mobile apparatus 104 via the local connection 106 based at least in part on a code associated with the network access credential information. This code may, for example, comprise a private identification number (PIN) code associated with the network access credential information, a PIN unlock code (PUC), and/or the like. In this regard, the code associated with the network access credential information may be entered by a user into the user interface 126 and/or user interface 136 for purposes of establishing the secure connection, for example using Bluetooth. The provision facilitation module 128 and/or setup module 138 may be configured to verify the code and cause establishment of the local connection 106 for transfer of the network access credential information in an instance in which the code is verified. As an example, in embodiments wherein the local connection 106 comprises a Bluetooth connection, the code associated with the network access credential information may be used as a pairing code for establishing a Bluetooth security association (SA) between the first mobile apparatus 102 and second mobile apparatus 104.

The setup module 138 may be configured to cause information about the second mobile apparatus 104 to be provided to the first mobile apparatus 102 via the local connection 106. The setup module 138 may, for example, provide the information about the second mobile apparatus 104 to the first mobile apparatus 102 in response to a request received from the first mobile apparatus 102. The information about the second mobile apparatus 104 may, for example, comprise a unique assigned identifier of the second mobile apparatus 104 (for example, an International Mobile Equipment Identity (IMEI), or the like) to be provided to the first mobile apparatus 102. This unique assigned identifier may be used by a network operator to ensure that the second mobile apparatus 104 has not been registered as stolen. The information about the second mobile apparatus 104 may additionally or alternatively comprise a trusted device identity for the second mobile apparatus 104. The trusted device identity for the second mobile apparatus 104 may, for example, comprise a device certificate for the second mobile apparatus 104, a cryptographic key(s) associated with the second mobile apparatus 104 that may be shared with other entities to facilitate verification of items signed and/or encrypted by the second mobile apparatus 104, and/or the like. The information about the second mobile apparatus 104 may additionally or alternatively comprise protection information indicating protection offered by the second mobile apparatus 104. The protection information may, for example, indicate a level of hardware and/or software protection offered by the second mobile apparatus 104. Examples could be the type of the chip used or information, if the system has passed a common criteria certification, such as an Evaluation Assurance Level (EAL). For example, in some example embodiments, an EAL of level 4 or higher may be required by the network operator. As an example, to the network access credentials some information about the "acceptable security level" may need to be provided by the operator in the first place (e.g. attaching policy information or setting some flags). If the information about the acceptable security level is missing, then the network operator (for example, the provisioning module 148) may determine, for example that either the network access credential information is "not-to-be-transferred-at-all" or that the network access credential information "can be transferred without further constraints".

In some example embodiments, the setup module 138 may sign the at least a portion of the information about the second mobile apparatus 104, for example, using the trusted device identity of the second mobile apparatus 102, prior to providing the information to the first mobile apparatus 102. In this regard, signing the information may serve to prevent tampering with the information and/or enable authentication of the origin of the information by the first mobile apparatus 102 and/or by the provisioning server 108. In embodiments wherein the setup module 138 is configured to sign the information about the second mobile apparatus 104, the setup module 138 may sign the information in a secure environment of the second mobile apparatus 104.

The provision facilitation module 128 may be configured to receive the information about the second mobile apparatus 104. The provision facilitation module 128 may be configured to format a message comprising the received information to request authorization to transfer the network access credential information to the second mobile apparatus 104. The provision facilitation module 128 may be configured to cause the formatted message to be sent to the provisioning apparatus 108 via the network 112.

The provision facilitation module 128 may be configured to additionally include at least an indication of a trusted device identity for the first mobile apparatus 102 in the message sent to the provisioning apparatus 108. The trusted device identity for the first mobile apparatus 102 may, for example, comprise a device certificate for the first mobile apparatus 102, a cryptographic key(s) associated with the first mobile apparatus 102 that may be shared with other entities to facilitate verification of items signed and/or encrypted by the first mobile apparatus 102, and/or the like. As an example, the provision facilitation module 128 may include the trusted device identity in the message sent to the provisioning apparatus 108. As another example, in some example embodiments, the provision facilitation module 128 may be configured to additionally or alternatively sign and/or encrypt at least a portion of the contents of the message using the trusted device identity (for example, using a key associated with the trusted device identity) for the first mobile apparatus 102 prior to sending the message to the provisioning apparatus 108. In embodiments wherein the provision facilitation module 128 is configured to sign the message contents, the provision facilitation module 128 may sign the message in a secure environment of the first mobile apparatus 102.

The provisioning module 148 may be configured to receive the message from the first mobile apparatus 102. The provisioning module 148 may be configured to extract the information contained in the message and determine whether to authorize transfer of the network access credential information based at least in part on the information included in the received message. For example, in embodiments wherein the information comprises information indicating protection offered by the second mobile apparatus 104, the provisioning module 148 may be configured to determine whether the protection offered by the second mobile apparatus 104 satisfies a predefined protection requirement and authorize transfer of the network access credential information only in an instance in which the offered protection satisfies the predefined protection requirement. As a further example, in embodiments wherein the information comprises a unique assigned identifier for the second mobile apparatus 104, the provisioning module 148 may consult with the subscriber database 110, such as by checking against an EIR, to verify that the second mobile apparatus 104 has not been registered as stolen. In this regard, the provisioning module 148 may, in some example embodiments authorize transfer of the network access credential information only in an instance in which the second mobile apparatus 104 has been verified as not having been registered as stolen. In embodiments wherein the message comprises a trusted device identity for the first mobile apparatus 102 and/or for the second mobile apparatus 104, the provisioning module 148 may verify the trusted device identity(ies), such as to verify that the network access credential information to be transferred has not been pirated by an unauthorized device or party.

In an instance in which the provisioning module 148 determines to authorize transfer of the network access credential information, the provisioning module 148 may update the subscriber database 110 to reflect a correlation between the network access credential information and an identifier of the second mobile apparatus 104. The provisioning module 148 may be further configured, in an instance in which the transfer of the network access credential information has been authorized, to cause authorization for the transfer to be provided to the first mobile apparatus 102.

The provision facilitation module 128 may receive the authorization and may, in response to the authorization, cause the network access credential information to be provided to the second mobile apparatus 104 via the local connection 106. In this regard, the provision facilitation module 128 may cause a copy of locally stored network access credential information to be provided to the second mobile apparatus 104. Alternatively, in some example embodiments, the authorization may comprise a provisioning package comprising a version of the network access credential information newly provisioned to the second mobile apparatus 104 by the provisioning module 148. In such example embodiments, the provision facilitation module 128 may forward the provisioning package to the second mobile apparatus 104. The provision facilitation module 128 may use hypertext transfer protocol (HTTP), short message service (SMS), internet protocol (IP), and/or the like to provide the network access credential information to the second mobile apparatus 104. In some example embodiments, the network access credential information provided to the second mobile apparatus 104 may be packaged in an Open Mobile Alliance Device Management (OMA DM) object.

In some example embodiments, the provision facilitation module 128 may sign and/or encrypt the network access credential information based at least in part on the trusted device identity for the second mobile apparatus 104 prior to sending the network access credential information to the second mobile apparatus 104. In embodiments wherein the provision facilitation module 128 signs and/or encrypts the network access credential information, the network access credential information may be signed and/or encrypted in a secure environment of the first mobile apparatus 102.

The setup module 138 may receive the network access credential information. The setup module 138 may verify successful receipt of the network access credential information and cause a confirmation of successful receipt to be sent to the first mobile apparatus 102 via the local connection 106. The provision facilitation module 128 may receive the confirmation and in response to the confirmation may cause a locally stored copy (e.g., a copy stored in the memory 122) of the network access credential information to be deleted.

The provision facilitation module 128 may be further configured to cause an OK message indicating successful transfer of the network access credential information to the second mobile apparatus 104 to be sent to the provisioning apparatus 108. The OK message may comprise a unique device identifier (for example, an IMEI) assigned to the first mobile apparatus 102 and may be signed based on a trusted device identity for the first mobile apparatus 102. If the network connection between the first mobile apparatus 102 and provisioning apparatus 108 is still available, the provision facilitation module 128 may cause the OK message to be sent to the provisioning apparatus 108 via the network 112. Alternatively, if the network connection between the first mobile apparatus 102 and provisioning apparatus 108 is no longer available, the provision facilitation module 128 may cause the OK message to be sent to the second mobile apparatus 104 via the local connection 106 so that the second mobile apparatus 104 may forward the OK message to the provisioning apparatus 108 after the second mobile apparatus 104 has established a connection with the network 112 (for example, by using the transferred network access credential information).

In some example embodiments, the setup module 138 may be configured not to use and/or may be unable to use the transferred network access credential information until receiving a permission message providing permission to use the network access credential information to access the operator network (for example, the network 112). In this regard, the permission message may be used by the first mobile apparatus 102 to ensure that both the first mobile apparatus 102 and second mobile apparatus 104 do not both attempt to access the operator network concurrently with the same network access credential information. In such example embodiments, the provision facilitation module 128 may be configured to cause a permission message to be sent to the second mobile apparatus 104 via the local connection 106.

The setup module 138 may receive the permission message and, in response to the permission message, may use the network access credential information to complete configuration of the second mobile apparatus 104 to access the network 112 in accordance with a configuration specified by the network access credential information. In some example embodiments, the provision facilitation module 128 may encrypt at least a portion of the transferred network access credential information with a locking key prior to sending the network access credential information to the second mobile apparatus 104. In such example embodiments, the permission message may comprise the locking key, thereby enabling the setup module 138 to unlock and use the network access credential information. The setup module 138 may accordingly be configured to use a received locking key to decrypt network access credential information encrypted using the locking key.

In some example embodiments, the setup module 138 may be configured to hand the network access credential information to a secure environment of the second mobile apparatus 104 and use the network access credential information to configure the second mobile apparatus 104 within a secure environment. In embodiments wherein the network access credential information comprises an installable application (for example, a SIM application), the setup module 138 may configure the second mobile apparatus 104 at least in part by installing the application. In instances wherein the second mobile apparatus 104 has been configured with network access credentials for a plurality of network operators (for example, with a plurality of SIMs), the setup module 138 may be configured to inform a radio module (for example, a radio module of the communication interface 124) of the newly configured access credential information.

In embodiments wherein at least a portion of the transferred network access credential information is encrypted (for example, based on the trusted device identity for the second mobile apparatus 104 and/or based on a locking key), the setup module 138 may be further configured to decrypt and unpack the network access credential information prior to configuring the second mobile apparatus 104. In such embodiments, the setup module 138 may decrypt and unpack the network access credential information in a secure environment of the second mobile apparatus 104.

In some example embodiments, a progress bar and/or other indication of progress of the network access credential information transfer may be displayed on a display of one or more of the first mobile apparatus 102 or second mobile apparatus 104. Additionally or alternatively, user prompts for any user action that may be required to facilitate transfer of the network access credential information may be displayed on a display of one or more of the first mobile apparatus 102 or second mobile apparatus 104. In some example embodiments, information in addition to network access credential information may be transferred from the first mobile apparatus 102 to the second mobile apparatus 104 via the local connection 106. This additional information may, for example, comprise personal user information (for example, phonebook data, contacts data, calendar data, network settings, and/or the like), network settings information, and/or the like.

FIG. 6 illustrates a flowchart according to an example method for access credential provisioning according to some example embodiments. In this regard, FIG. 6 illustrates operations that may be performed at the first mobile apparatus 102. The operations illustrated in and described with respect to FIG. 6 may, for example, be performed by, with the assistance of, and/or under the control of one or more of the processor 120, memory 122, communication interface 124, user interface 126, or provision facilitation module 128. Operation 600 may comprise receiving information about the second mobile apparatus 104. The processor 120, memory 122, communication interface 124, and/or provision facilitation module 128 may, for example, provide means for performing operation 600. Operation 610 may comprise causing the information about the second mobile apparatus 104 to be provided to the provisioning apparatus 108. The processor 120, memory 122, communication interface 124, and/or provision facilitation module 128 may, for example, provide means for performing operation 610. Operation 620 may comprise receiving authorization from the provisioning apparatus to transfer the network access credential information from the first mobile apparatus to the second mobile apparatus 104. The processor 120, memory 122, communication interface 124, and/or provision facilitation module 128 may, for example, provide means for performing operation 620. Operation 630 may comprise, in response to the authorization, causing the network access credential information to be provided to the second mobile apparatus 104. The processor 120, memory 122, communication interface 124, and/or provision facilitation module 128 may, for example, provide means for performing operation 630. Operation 640 may comprise receiving a confirmation from the second mobile apparatus 104 that the network access credential information was received successfully by the second mobile apparatus 104. The processor 120, memory 122, communication interface 124, and/or provision facilitation module 128 may, for example, provide means for performing operation 640. Operation 650 may comprise causing deletion of the network access credential information from a memory of the first mobile apparatus 102. According to some example embodiments, Operation 650 may comprise causing the network access credential information in the memory of the first mobile apparatus 102 to be disabled or otherwise preventing the first mobile apparatus 102 from accessing the network 112. The processor 120, memory 122, communication interface 124, and/or provision facilitation module 128 may, for example, provide means for performing operation 650. Operation 660 may comprise causing a permission message to be sent to the second mobile apparatus 104, providing permission to the second mobile apparatus 104 to use the network access credential information to access the operator network (for example, the network 112). The processor 120, memory 122, communication interface 124, and/or provision facilitation module 128 may, for example, provide means for performing operation 660.

FIG. 7 illustrates a flowchart according to an example method for access credential provisioning according to some example embodiments. In this regard, FIG. 7 illustrates operations that may be performed at the second mobile apparatus 104. The operations illustrated in and described with respect to FIG. 7 may, for example, be performed by, with the assistance of, and/or under the control of one or more of the processor 130, memory 132, communication interface 134, user interface 136, or setup module 138. Operation 700 may comprise causing information about the second mobile apparatus 104 to be provided to the first mobile apparatus 102. The processor 130, memory 132, communication interface 134, and/or setup module 138 may, for example, provide means for performing operation 700. Operation 710 may comprise receiving, from the first mobile apparatus 102, network access credential information transferred from the first mobile apparatus 102 to the second mobile apparatus 104. The processor 130, memory 132, communication interface 134, and/or setup module 138 may, for example, provide means for performing operation 710. Operation 720 may comprise causing a confirmation of successful receipt of the network access credential information to be sent to the first mobile apparatus 102. The processor 130, memory 132, communication interface 134, and/or setup module 138 may, for example, provide means for performing operation 720. Operation 730 may comprise receiving a permission message from the first mobile apparatus 102 providing permission to use the network access credential information to access the network 112. The processor 130, memory 132, communication interface 134, and/or setup module 138 may, for example, provide means for performing operation 730. Operation 740 may comprise, responsive to the permission message, using the network access credential information to complete configuration of the second mobile apparatus 104 to access the operator network (for example, the network 112). The processor 130, memory 132, communication interface 134, and/or setup module 138 may, for example, provide means for performing operation 740.

FIGS. 6-7 each illustrate a flowchart of a system, method, and computer program product according to some example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 122, in the memory 132, and/or in the memory 142) and executed by a processor in the computing device (for example, by the processor 120, by the processor 130, and/or by the processor 140). In some example embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a second mobile apparatus 104, first mobile apparatus 102, and/or a provisioning apparatus 108) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, a second mobile apparatus 104, first mobile apparatus 102, and/or a provisioning apparatus 108) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. According to some example embodiments, a suitably configured processor (for example, the processor 120, processor 130, and/or processor 140) may provide all or a portion of the elements. In other example embodiments, all or a portion of the elements may be configured by and operate under control of a computer program product. The computer program product for performing the methods of some example embodiments may include a computer-readable storage medium (for example, the memory 122, memory 132, and/or memory 142), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    entering a network access credential transfer mode on a first apparatus;
    establishing a secure connection between the first apparatus and a second apparatus;
    causing information about the second apparatus to be provided from the second apparatus to the first apparatus via the secure connection, wherein the first apparatus is provisioned with network access credential information for a network, and wherein the network access credential information is to be transferred from the first apparatus to the second apparatus;
    providing to the second apparatus, the network access credential information from the first apparatus;
    causing a confirmation of receipt of the network access credential information to be received by the first apparatus from the second apparatus; and
    causing the network access credential information to be deleted from a memory of the first apparatus in response to receiving the confirmation.

2. The method of claim 1, further comprising:
    transmitting a permission message from the first apparatus to the second apparatus, the permission message providing permission to the second apparatus to use the network access credential information to access the network; and
    responsive to the permission message, using the network access credential information to cause complete configuration of the second apparatus to access the network in accordance with a configuration specified by the network access credential information.

3. The method of claim 2, wherein at least a portion of the received network access credential information is encrypted with a locking key, and wherein the permission message comprises the locking key, the method further comprising:
    using the locking key to unlock and use the network access credential information.

4. The method of claim 1, wherein:
    the secure connection between the first apparatus and the second apparatus is a local connection between the first apparatus and the second apparatus; and
    transmitting the network access credential information comprises receiving the network access credential information via the secure local connection.

5. The method of claim 4, further comprising:
    causing establishment of the local connection based at least in part on a code associated with the network access credential information.

6. The method of claim 1, wherein transfer of the network access credential information from the first apparatus to the second apparatus is authorized by a provisioning apparatus based at least in part on the provided information about the second apparatus.

7. The method of claim 1, wherein the information about the second apparatus comprises a unique assigned identifier of the second apparatus, and wherein receiving the network access credential information comprises receiving the network access credential information in an instance in which a provisioning apparatus has verified based at least in part on the unique assigned identifier that the second apparatus is not registered as stolen.

8. The method of claim 1, wherein the information about the second apparatus comprises protection information indicating protection offered by the second apparatus, and wherein transmitting the network access credential information comprises transmitting the network access credential information in an instance in which a provisioning apparatus determines that the protection offered by the second apparatus satisfies a predefined protection requirement.

9. An apparatus comprising at least one processor and at least one memory storing computer program code, wherein the at least one memory and stored computer program code are configured, with the at least one processor, to cause the apparatus to at least:
    enter a network access credential transfer mode on the apparatus, wherein the apparatus is a first apparatus;
    establish a secure connection between the first apparatus and a second apparatus;
    cause information about the second apparatus to be provided to the first apparatus, wherein the first apparatus is provisioned with network access credential information for a network, and wherein the network access credential information is to be transferred from the first apparatus to the second apparatus;
    provide the network access credential information from the first apparatus to the second apparatus;
    cause a confirmation of receipt of the network access credential information to be received by the first apparatus from the second apparatus; and
    cause the network access credential information to be deleted from a memory of the first apparatus in response to receiving the confirmation.

10. The apparatus of claim 9, wherein the at least one memory and stored computer program code are configured, with the at least one processor, to further cause the apparatus to:
    send a permission message from the first apparatus to the second apparatus, the permission message providing permission to the second apparatus to use the network access credential information to access the network; and
    responsive to the permission message, using the network access credential information, cause the second apparatus to complete configuration of the second apparatus to access the network in accordance with a configuration specified by the network access credential information.

11. The apparatus of claim 10, wherein at least a portion of the received network access credential information is encrypted with a locking key, and wherein the permission message comprises the locking key, and wherein the at least one memory and stored computer program code are configured, with the at least one processor, to further cause the apparatus to:
    use the locking key to unlock and use the network access credential information.

12. The apparatus of claim 9, wherein the secure connection between the first apparatus and the second apparatus is a local connection between the first apparatus and the second apparatus; and wherein the first apparatus is further configured to transmit the network access credential information via the local connection.

13. The apparatus of claim 12, wherein the at least one memory and stored computer program code are configured, with the at least one processor, to further cause the apparatus to:
    cause establishment of the local connection based at least in part on a code associated with the network access credential information.

14. The apparatus of claim 9, wherein transfer of the network access credential information from the first apparatus to the second apparatus is authorized by a provisioning apparatus based at least in part on the provided information about the second apparatus.

15. The apparatus of claim 9, wherein the information about the second apparatus comprises a unique assigned identifier of the second apparatus, and wherein the at least one memory and stored computer program code are configured, with the at least one processor, to cause the first apparatus to transmit the network access credential information to the second apparatus in an instance in which a provisioning apparatus has verified based at least in part on the unique assigned identifier that the second apparatus is not registered as stolen.

16. The apparatus of claim 9, wherein the information about the second apparatus comprises protection information indicating protection offered by the second apparatus, and wherein the at least one memory and stored computer program code are configured, with the at least one processor, to cause the first apparatus to transmit the network access credential information to the second apparatus in an instance in which a provisioning apparatus determines that the protection offered by the apparatus satisfies a predefined protection requirement.

17. The apparatus of claim 9, wherein the apparatus comprises or is embodied on a mobile computing device, the mobile computing device comprising user interface circuitry and user interface software stored on one or more of the at least one memory; wherein the user interface circuitry and user interface software are configured to:

facilitate user control of at least some functions of the mobile computing device through use of a display; and cause at least a portion of a user interface of the mobile computing device to be displayed on the display to facilitate user control of at least some functions of the mobile computing device.

18. A computer program product comprising at least one non-transitory computer-readable storage medium having computer-readable program instructions stored therein, the computer-readable program instructions comprising:

program code instructions configured to enter a network access credential transfer mode on a first apparatus;

program code instructions configured to establish a secure connection between the first apparatus and a second apparatus;

program instructions configured to cause information about the second apparatus to be provided to the first apparatus, wherein the first apparatus is provisioned with network access credential information for a network, and wherein the network access credential information is to be transferred from the first apparatus to the second apparatus; and program instructions configured to cause the first apparatus to transmit the network access credential information to the second apparatus;

program code instructions configured to cause a confirmation of receipt of the network access credential information to be received by the first apparatus from the second apparatus; and program code instructions configured to cause the network access credential information to be deleted from a memory of the first apparatus.

* * * * *